US011720595B2

(12) United States Patent
Zheng et al.

(10) Patent No.: US 11,720,595 B2
(45) Date of Patent: Aug. 8, 2023

(54) GENERATING A QUERY USING TRAINING OBSERVATIONS

(71) Applicant: Salesforce, Inc., San Francisco, CA (US)

(72) Inventors: Zuye Zheng, San Francisco, CA (US); Scott Musser, Longmont, CO (US); Raghav Ravichandran, Fremont, CA (US); Asra Yousuf, San Francisco, CA (US); Meghana Ashok, San Francisco, CA (US); Andrew Ouyang, Oakland, CA (US); Aditya Kochhar, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 178 days.

(21) Appl. No.: 17/072,597

(22) Filed: Oct. 16, 2020

(65) Prior Publication Data

US 2022/0121685 A1 Apr. 21, 2022

(51) Int. Cl.
*G06F 16/00* (2019.01)
*G06F 16/28* (2019.01)
(Continued)

(52) U.S. Cl.
CPC .......... *G06F 16/282* (2019.01); *G06F 16/244* (2019.01); *G06F 16/288* (2019.01);
(Continued)

(58) Field of Classification Search
CPC .... G06F 16/282; G06F 16/244; G06F 16/288; G06F 16/90324; G06N 20/20; G06K 9/6257
See application file for complete search history.

(56) References Cited

U.S. PATENT DOCUMENTS

| 9,235,846 B2* | 1/2016 | Petschulat ........... G06F 16/2453 |
| 2010/0034685 A1* | 2/2010 | Wicht .................. F04C 27/009 |
| | | 418/140 |

(Continued)

FOREIGN PATENT DOCUMENTS

WO WO2021076775 * 4/2021

OTHER PUBLICATIONS

Cano et al., "Learning with Bayesian Networks and Probability Trees to Approximate a Joint Distribution". IEEE 2011.*

*Primary Examiner* — Daniel A Kuddus
(74) *Attorney, Agent, or Firm* — Holland & Hart LLP

(57) ABSTRACT

Methods, systems, and devices for generating a query using training observations are described. According to the techniques described herein, a device (e.g., an application server) may receive a set of queries including a set of fields in a tenant-specific dataset associated with the query. The device may generate a set of training observations for the queries based on the set of fields. The device then trains a first machine learning model to determine grouping hierarchies and a second machine learning model to determine aggregation predictions. The device then builds a combined machine learning model based on the determined grouping hierarchies and the aggregation predictions. According to techniques described herein, the device uses the determined grouping hierarchies and the aggregation predictions to rank a set of suggested queries determined in response to an input query and selects a suggested query for display based on the ranking.

18 Claims, 11 Drawing Sheets

(51) Int. Cl.
*G06F 16/242* (2019.01)
*G06N 20/20* (2019.01)
*G06F 16/9032* (2019.01)
*G06F 18/214* (2023.01)

(52) U.S. Cl.
CPC .... *G06F 16/90324* (2019.01); *G06F 18/2148* (2023.01); *G06N 20/20* (2019.01)

(56) References Cited

U.S. PATENT DOCUMENTS

| | | | | |
|---|---|---|---|---|
| 2012/0310763 | A1* | 12/2012 | Meehan | G06Q 30/0201 705/26.2 |
| 2014/0278755 | A1* | 9/2014 | Eberl | G06F 16/2228 705/7.29 |
| 2014/0278771 | A1* | 9/2014 | Rehman | G06Q 30/0201 705/7.31 |
| 2014/0280065 | A1* | 9/2014 | Cronin | G06F 16/245 707/769 |
| 2014/0280190 | A1* | 9/2014 | Cronin | G06F 16/2445 707/741 |
| 2014/0280192 | A1* | 9/2014 | Cronin | G06F 16/2455 707/741 |
| 2014/0287755 | A1* | 9/2014 | Lim | H04W 36/00835 455/436 |
| 2016/0125011 | A1* | 5/2016 | Petschulat | G06F 17/18 707/722 |
| 2017/0353477 | A1* | 12/2017 | Faigon | G06F 21/554 |
| 2018/0069888 | A1* | 3/2018 | Muddu | G06V 10/225 |
| 2018/0101537 | A1* | 4/2018 | Govindarajan | G06F 16/24578 |
| 2019/0043003 | A1* | 2/2019 | Fisher | G06N 3/04 |
| 2019/0101537 | A1* | 4/2019 | Weitz | G01N 33/573 |
| 2019/0180187 | A1* | 6/2019 | Rawal | G06N 3/044 |
| 2019/0236598 | A1* | 8/2019 | Padmanabhan | G06Q 20/0655 |
| 2019/0340283 | A1* | 11/2019 | Schneider | G06F 16/2428 |
| 2020/0034685 | A1* | 1/2020 | Kempf | G06N 3/0454 |

* cited by examiner

GENERATING A QUERY USING TRAINING OBSERVATIONS

FIELD OF TECHNOLOGY

The present disclosure relates generally to database systems and data processing, and more specifically to generating a query using training observations.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A user may use the cloud platform to query for a tenant's data and extract meaningful information. In some systems, the user may use a specific format or specific terms to query the tenant's data. Some database systems may support searches using natural language queries. To support such queries, possible natural language queries may be mapped to database queries.

DETAILED DESCRIPTION

Figure 1:
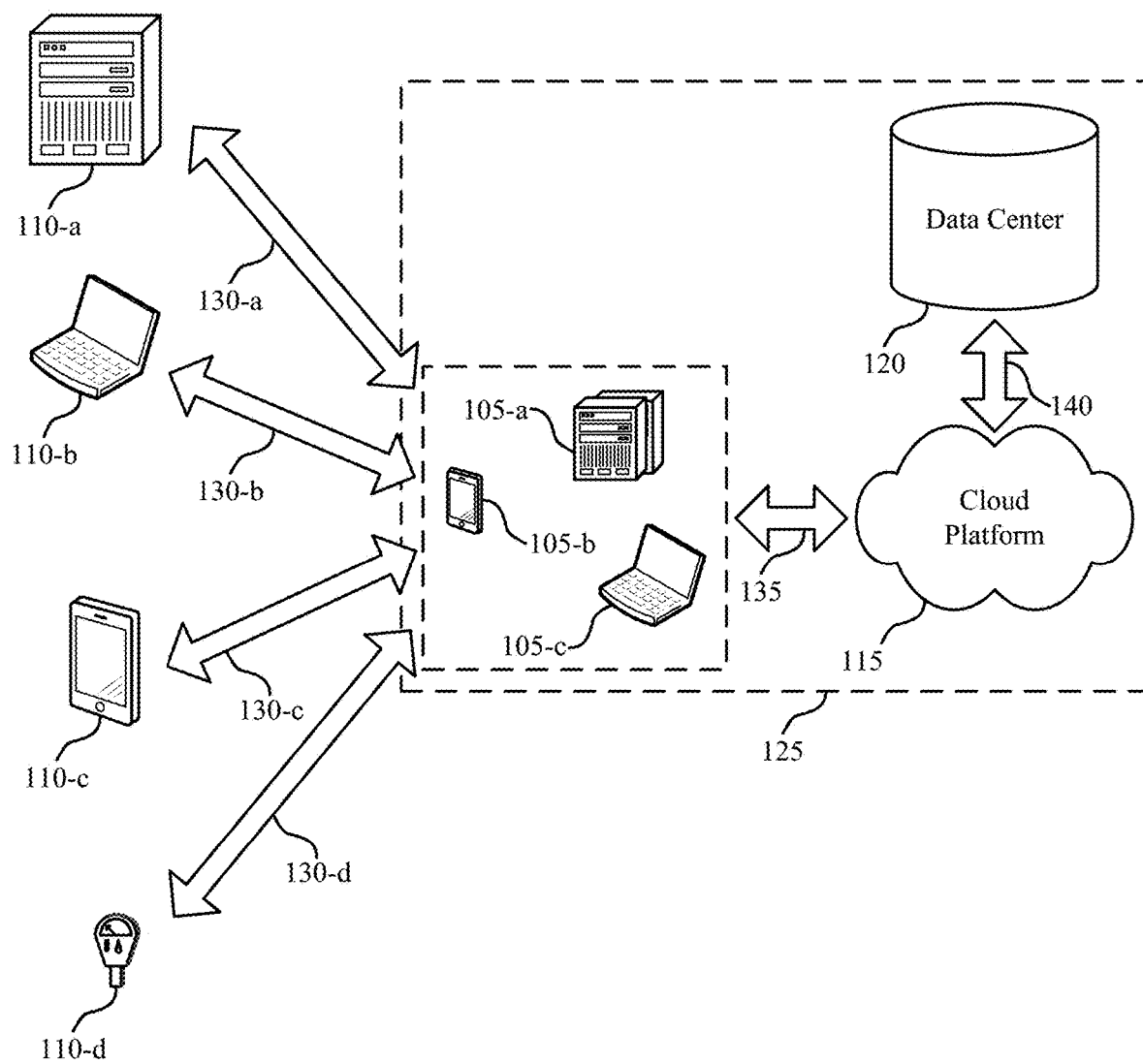
FIG. 1 illustrates an example of a system for building a machine learning model that supports generating a query using training observations in accordance with aspects of the present disclosure.

A tenant of a multi-tenant database may store information and data for users, customers, organizations, etc. in a database. For example, the tenant may manage and store data and metadata for exchanges, opportunities, deals, assets, customer information, and the like. The tenant may query the database in ways to extract meaningful information from the data, which may assist the tenant in future decision making and analysis. In some cases, a report may include the data query and an appropriate title which describes the queried data in terms and conventions often used by the tenant. These reports, queries, and interactions, as well as corresponding metadata, may also be stored in the databases. A user may be able to combine or cross-analyze multiple reports to further extract meaningful data and information.

Database systems may support searches using natural language queries. To support such queries, possible natural language queries may be mapped to database queries. A database administrator or user may maintain a mapping of various grammatical forms of natural language queries to database queries. Additionally, the mapped database queries may be processed on datasets with data that is not structured or contextual, meaning that the datasets are generic and may not reflect relationships between data that may occur within datasets that are unique to the owner of the dataset. Thus, the query results may be inaccurate, non-contextual, or ineffective to the user who submitted the query. Additionally, some systems (e.g., cloud platforms or other systems) may use defined grammatical structures to parse unstructured natural language queries and generate database queries. An expert user (e.g., a product manager, an administrator, etc.) may define a grammatical structure for a database system to aid in converting natural language queries into database queries.

In some examples, some database systems may identify a grammatical structure of a query (e.g., natural language query) based on a set of defined grammatical structures and can build a database query based on the identified grammatical structure. In such systems, an administrator or expert may enumerate a common natural language query into all grammatical forms, and each received natural language query can be mapped to a database query based on matching the natural language query to a known grammatical form. A system user may submit a question to the database system, and the database system may attempt to identify a similar question that has already been enumerated, which can be used to determine the associated database query. This way, when a user enters a natural language query, the database system can identify an enumerated natural language query that is similar to the entered query and execute the database query that corresponds to the identified query. As such, the database system may interpret a natural language query from a user and provide an appropriate data query to the user. However, a large dataset associated with each tenant may make it difficult for a tenant to run analytics and determine related queries in a multi-tenant database.

Various aspects of the present disclosure provide techniques for utilization of machine learning models to generate a related (e.g., next-best) query in response to receiving a query from a user. Techniques described herein may support a database query generation system that learns hierarchical relationships between fields of queries, thereby generating a related query upon receiving a query. Such techniques may improve the accuracy of query results, reduce system configuration time, and automatically adapt to changes in data usage patterns. A server (e.g., a database server, application server) of a database system may receive natural language queries (e.g., a submitted question, a submitted search phrase, etc.) and may use machine learning models to learn a customer-specific structure of natural language queries. For instance, the techniques described herein may support a suggested query generation based on a grouping mechanism and an aggregation field and function mechanism. The suggested query generation includes receiving a set of queries (e.g., database queries, declarative queries, natural language queries, etc.) and parsing each query to identify a number of fields within a dataset associated with the query. The database query generation system may generate and store a number of training observations generated using the fields within the dataset associated with the query. The database query generation system may train a machine learning model on the number of training observations based on the grouping mechanism and the aggregation field and function mechanism. The grouping mechanism may identify a hierarchical relationship between fields of a query and the aggregation field and function mechanism may identify a function associated with a particular group of fields. In some cases, the related queries may be tenant-specific and adjust to tenant-specific preferences, thereby improving query accuracy for specific tenants in a multi-tenant database system.

Upon receiving an input query, one or more aspects of the present disclosure provides for determining a suggested query based on the input query and the machine learning model. For example, the system (e.g., a server, a database server, application server) may receive a query on the "Opportunities" dataset grouped by "Region." The system may determine (e.g., based on training observations from previous queries) that a hierarchical relationship exists between the fields (Region→Country) and/or (Year→Quarter) in context of the dataset (e.g., Opportunities). In such an example, the database query generation system may suggest the "Opportunities" dataset grouped by "Region" and "Country" as a suggested query. That is, the database query generation system may suggest the "Opportunities" dataset grouped by "Country" in addition to being grouped by "Region." Similarly, if the input query indicated a grouping by "Year," the database query generation system may suggest the "Opportunities" dataset grouped by "Year" and "Quarter" as a suggested query. This allows the database query generation system to generate suggested queries upon receiving an input query based on a tenant-specific machine learning model, thereby improving the robustness of the system across different tenants.

Aspects of the disclosure are initially described in the context of an environment supporting an on-demand database service. Aspects of the disclosure are further described with respect to a general system diagram that shows computing components and data flows that support generating a query using training observations, a diagram illustrating a user interface, and a process flow diagram illustrating various process and dataflows that support the techniques herein. Aspects of the disclosure are further illustrated by and described with reference to apparatus diagrams, system diagrams, and flowcharts that relate to generating a query using training observations.

FIG. 1 illustrates an example of a system 100 for cloud computing that supports generating a query using training observations in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The data center 120 may be example of a multi-tenant system that supports data storage, retrieval, data analytics, and the like for various tenants, such as the cloud clients 105. As such, each cloud client 105 may be provided with a database instance in the datacenter 120, and each database instance may store various datasets that are associated with the particular cloud client 105. More particularly, each cloud client 105 may have a specific set of datasets that are unique for the cloud client 105. The cloud platform and datacenter 120 support a system that processes set of datasets for a particular cloud client 105. In some examples, the cloud platform and datacenter 120 support a system that receives a set of queries from a particular cloud client 105 and generates a suggested query (or related query) based on the set of queries. In some examples, the set of queries may be generated by processing queries (e.g., natural language queries, declarative queries, handwritten queries). As such, the suggested query in response to an input query is based on a set of fields in a tenant-specific dataset associated with the input query. That is, the suggested query generation may support customer specific analytics by capturing contexts or meanings that are unique to the cloud client 105. As such, each set of fields may be unique to a cloud client 105, but the technique described herein may be scaled to be applicable to a plurality of cloud clients without requiring specific configuration for each cloud client 105.

Some analytical data systems may utilize mapping techniques to map natural language queries to database queries. These techniques may require significant configuration and upkeep. Further, these mapping techniques may not be unique for a specific entity's data, and as such, the queries may result in ineffective query results. Additionally, the various datasets may be unique for specific entities, but a database table may not capture the various implicit context that is in the data due to the unique data for an entity. Thus, analytical systems that use generic database queries on datasets that do not capture implied meaning are not able to identify specific insights within the data and do not support unique actions that may be triggered as a result of a query. In some examples, the analytical data systems may interpret a natural language query from a user and provide an appropriate response to the natural language query to the user. However, a large dataset associated with each tenant may make it difficult for a tenant to run analytics and determine related queries in a multi-tenant database As described herein, the datacenter 120 and cloud platform 115 may support processing of entity specific datasets to generate utilization of machine learning models to generate a related (e.g., next-best) query in response to receiving a query from a user. Further, techniques described herein may support a database query generation system that generates multiple training observations upon receiving a set of queries, learns hierarchical relationships between fields of a set of queries (e.g., natural language queries), and generates a related query upon receiving an input query based on the learned hierarchical relationships between the fields. Such techniques may improve the accuracy of query results, reduce system configuration time, and automatically adapt to changes in data usage patterns.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

A cloud client 105 may be an example of a company that sells widgets around the world. The company maintains a dataset (e.g., table) named opportunities that lists opportunities for selling different versions of the widget and priorities associated with the particular opportunities. The system described herein may receive a query (e.g., a database query) on the "Opportunities" dataset grouped by "Region," "Country," "Year," and "Quarter" and generate one or more training observations from this query. The system may determine that a hierarchical relationship exists between the fields of the query (Region→Country→Year→Quarter) in context of the dataset (e.g., Opportunities). In such an example, if the database query generation system received a query on the dataset "Opportunities," the database query generation system may suggest the "Opportunities" dataset grouped by "Region" as a first suggested query. That is, when a user runs a query on the data, such as "Opportunities" the system may display a related query such as the "Opportunities" dataset grouped by "Region" (or any other query related to the "Opportunities" dataset, such as "Opportunities" grouped by "Country"). Additionally or alternatively, the system may display a second suggested query if the user selects the first suggested query. For example, the system may display the second suggested query such as the "Opportunities" dataset grouped by "Region" and "Year."

Figure 2:
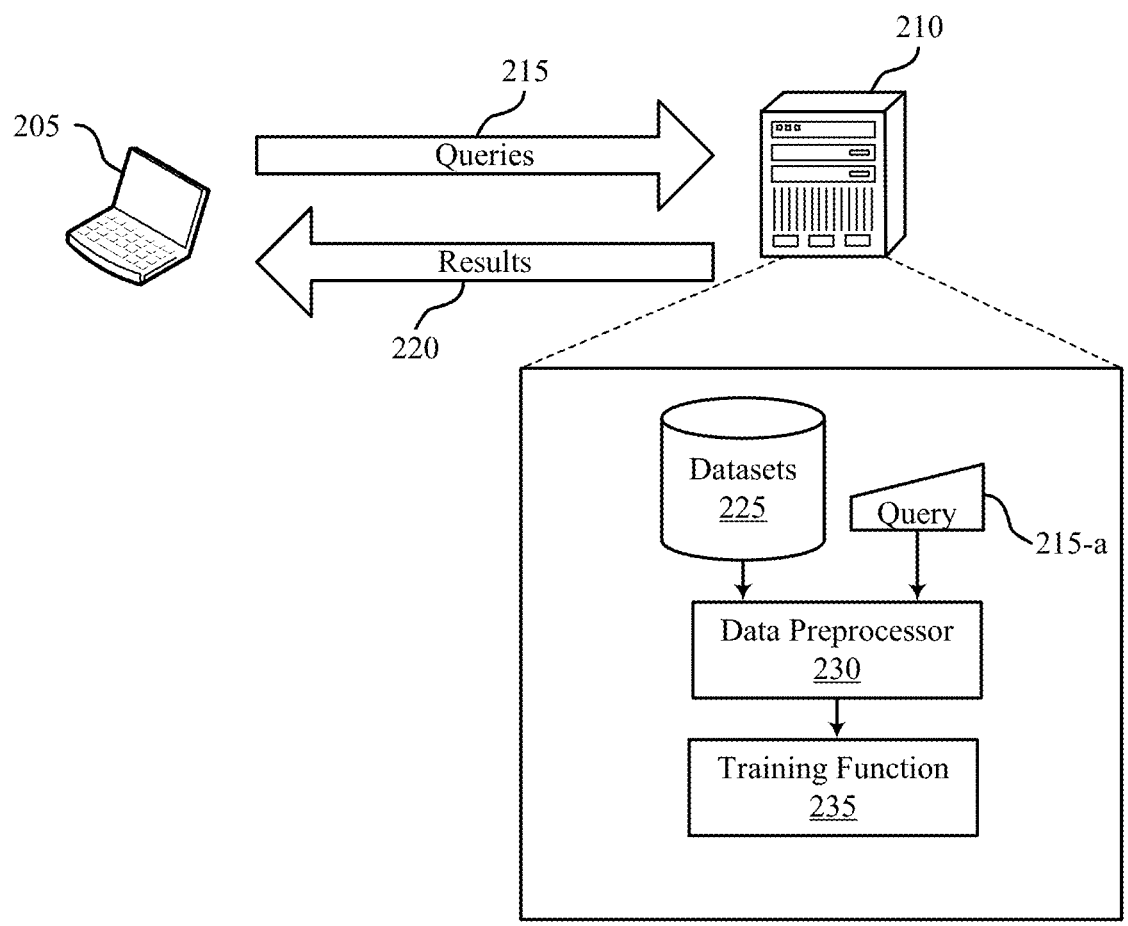
FIG. 2 illustrates an example of a computing system that supports generating a query using training observations in accordance with aspects of the present disclosure.

FIG. 2 illustrates an example of a computing system 200 that supports generating a query using training observations in accordance with aspects of the present disclosure. The computing system 200 includes a user device 205 and a server 210. The user device 205 may be example of a device associated with a cloud client 105 or contact 110 of FIG. 1. The server 210 may be examples of aspects of the cloud platform 115 and the datacenter 120 of FIG. 1. For example, the server 210 may be represent various devices and components that support an analytical data system as described herein. The server 210 may support a multi-tenant database system, which may manage various datasets 225 that are associated with specific tenants (e.g., cloud clients 105). In some examples, the datasets 225 may include a set of fields related to the tenant. The server 210 may also support data retrieval in response to queries 215 received from user devices, such as user device 205. The data retrieved in response to a query 215 may be surfaced to a user at the user device 205.

As described, the server 210 may manage various datasets 225 that are associated with specific tenants. For example, a datastore may store a set of datasets 225 that are associated with the tenant corresponding to user device 205. Each dataset of the set of datasets 225 may be a database table. To support learned data techniques described herein, a data preprocessor 230 may identify fields from each dataset 225 used in multiple queries. The data preprocessor 230 may store training observations including an indication of one or more fields of a data set (e.g., a column name) grouped according to hierarchical relationships between a subset of the fields. In some examples, the fields may be grouped in a first training observation according to a first permutation and in a second training observation according to a second permutation.

According to one or more aspects of the present disclosure, the tenant-specific dataset may be associated with at least one of reports, report types, data objects, data sets, or a combination thereof. In one example, a data object may have up to 500 fields, a report type may have up to 1000 fields, and an analytics dataset may have 5000 fields. Thus, selecting the related fields to use in an analysis is a challenge for computing system 200. For autonomous analytics, the server 210 provides a learnable system to guide users to build a related query (e.g., next best query) which will be presented in response to receiving an input query. In some examples, the next best query may provide secondary "related" questions along with the primary "top answer." The related query (e.g., next best query) may be or include a collection of multiple models to suggest different parts of the related query (e.g., next best query). The suggested parts may include a next best grouping and a next best aggregation field and function for a query.

In some examples, the computing system 200 may support analytics that is different than standalone analytic solutions targeted to analysts who often perform analytics on decentralized or personal copies of datasets, only presenting final results. Cloud native analytics may mean that all datasets belonging to a tenant or an organization are centralized in an analytics data store (e.g., hosted in server 210) and shared amongst all users (with consideration to sharing controls) of that organization. This allows the computing system 200 to aggregate the usage across all users of an organization to build a generalized, but organization-specific models of data usage patterns. This architecture enables training these models thus enforcing tenant level data governance.

The data preprocessor 230 may receive a set of queries 215 (e.g., natural language queries or database queries). In some instances, each query of the set of queries may include a set of fields in a tenant-specific dataset associated with the query. The data preprocessor 230 may receive the set of queries converted into a set of queries understandable by the data preprocessor 230. In some examples, the data preprocessor 230 may parse each query of the set of queries to identify the set of fields included in the set of queries. The data preprocessor 230 may identify a query 215-a from the set of queries. In some examples, the data preprocessor 230 may generate a set of training observations for the query 215-a based on the set of fields included (identified by the data preprocessor 230) in the query 215-a. In some cases, the data preprocessor 230 may generate a first training observation including a first subset of fields and a second training observation including a second subset of fields, the first subset of fields being greater than the second subset of fields. In some examples, the data preprocessor 230 may identify a first permutation of the set of fields and a second permutation of the set of fields. The data preprocessor 230 may then group fields included in the first permutation in the first training observation and fields included in the second permutation in the second training observation. In some examples, the data preprocessor 230 may store the set of training observations. In some cases, the data preprocessor 230 may send the set of training observations to the training function 235.

The training function 235 may train a first machine learning model on the stored set of training observations to determine grouping hierarchies including hierarchical relationships between the subset of the set of fields. The training function 235 may be utilized to generate a next best grouping for a set of fields. By the nature of analytical queries, groupings have different characteristics than aggregations. In some examples, separate mathematical models may be used to determine next best groupings and next best aggregations. Groupings, unlike aggregations are sequential and often hierarchical (e.g., an order matters in generating groupings). For example, a grouping of "Country→State→City" is logical based on a hierarchical relationship between "Country," "State," and "City." Alternatively, a grouping by "City→State→Country" may lead to incorrect results. For instance, a grouping by "City→State→Country" may group Paris, Tex., USA with Paris, Île-de-France, France. Thus, the training function 235 may train the first machine learning model (e.g., the next best grouping model) by maintaining the integrity of hierarchies in the data.

In some examples, the grouping hierarchies may be based on a sequence of the set of fields. Additionally or alternatively, the grouping suggestions may be contextual to the dataset and there may be a limit to the number of groupings for analytical queries. Given these considerations, the training function 235 may use fixed length inputs that include the dataset when training the first machine learning model (e.g., the next best grouping model). For an example query on the "Opportunities" dataset grouped by "Region→Country→Year→Quarter," the following training observations may be generated:

Opportunities, <empty>, <empty>, <empty>->Region
Opportunities, Region, <empty>, <empty>->Country
Opportunities, Region, Country, <empty>->Year
Opportunities, Region, Country, Year->Quarter There may be some additional data relationships among the fields. The training function 235 may determine relationships such as Year→Quarter or Country→Year→Quarter. In some examples, the training function 235 may permute training observations according to an opposite hierarchical relation. For example, by considering the opposite hierarchical relations, the following training observations may be generated:

Opportunities, Year, <empty>, <empty>->Quarter
Opportunities, Country, <empty>, <empty>->Year
Opportunities, Country, Year, <empty>->Quarter According to one or more aspects, the training function 235 may train a second machine learning model on the stored set of training observations to determine code aggregation predictions including predicted functions associated with one or more of the subset of the set of fields. Additionally or alternatively, the training function 235 may train the second machine learning model on the stored set of training observations to determine aggregation predictions including an aggregation field associated with one or more of the subset of the set of fields. In some examples, a predicted function is based on the aggregation field. In some examples, the aggregation predictions may be based on the hierarchical relationships between one or more of the subset of the set of fields. The predicted functions associated with the one or more of the subset of the set of fields may include a mathematical operation on the one or more of the subset of the set of fields.

Aggregations may also have some similar consideration such that the fields are contextual to the dataset and have limits. Determination of a next best aggregation may include a compound prediction. That is, instead of predicting the next best field, the training function 235 may predict an aggregation function associated with that field or a group of fields. In addition, measures and aggregations may not be hierarchical (i.e., the aggregations may be predicted separately). In some examples, the aggregations may not be hierarchical, and the training function 235 may not be able to use the "last" aggregation to predict the next best aggregation. To fill in this missing context, the training function 235 may use groupings (as grouping often dictates the type of aggregations). For instance, in case of "Opportunities" dataset, the training function 235 may determine that if the "Opportunities" dataset is grouped by year and quarter, then the user may be interested in "sum of amount" of deals closed in those time periods rather than grouping by sales representatives. Additionally or alternatively, the training function 235 may determine that if the "Opportunities" dataset is grouped by year and quarter, then the user may be interested in the "sum of forecast amount." Given these considerations the training function 235 may use fixed length inputs of the dataset and groupings to train the second machine learning model to predict the next best aggregation field. For example, given a query such as "Average Duration" and "Sum of Amount" for "Opportunities" grouped by "Year→Month→Day," the following training observations may be generated:

Opportunities, Year, Month, Day, <empty>-->Duration
Opportunities, Year, Month, Day, <empty>-->Amount Additionally or alternatively, given that groupings are hierarchical, the following permutations of training observations may be generated:

Opportunities, Year, Month, <empty>, <empty>-->Duration
Opportunities, Year, Month, <empty>, <empty>-->Amount
Opportunities, Year, <empty>, <empty>, <empty>-->Duration
Opportunities, Year, <empty>, <empty>, <empty>-->Amount
Opportunities, <empty>, <empty>, <empty>-->Duration
Opportunities, <empty>, <empty>, <empty>-->Amount The training function 235 may use the two sets of observations to predict the next best aggregation field. In some examples, the training function 235 may predict the next best aggregation function. The training function 235 may predict the next best aggregation function given the field and its context. In some examples, the following training observations may be generated for predicting the next best aggregation function:

Opportunities, Year, Month, Day, <empty>, Duration->average
Opportunities, Year, Month, Day, <empty>, Amount->sum
Opportunities, Year, Month, <empty>, <empty>, Duration->average
Opportunities, Year, Month, <empty>, <empty>, Amount->sum
Opportunities, Year, <empty>, <empty>, <empty>, Duration->average
Opportunities, Year, <empty>, <empty>, <empty>, Amount->sum
Opportunities, <empty>, <empty>, <empty>, <empty>, Duration->average
Opportunities, <empty>, <empty>, <empty>, <empty>, Amount->sum Using the first model the training function 235 may predict the next best aggregation field and using that prediction the training function 235 may use the second model to predict the next best aggregation function for that field. In some examples, the training function 235 may build a combined machine learning model based on the determined grouping hierarchies and the aggregation predictions.

As the training function 235 build a combined machine learning model, the training function 235 is trained for suggesting a related query. Thus, the training function 235 may support valuable data analytics. For example, queries 215 received from the user device 205 may be converted to a query, which may be used to generate a set of suggested queries based on received query and the combined machine learning model. For example, the training function 235 may use the determined grouping hierarchies and the aggregation predictions to rank the suggested queries and identify a result (e.g., a top ranked related query). As such, the result 220 including the related query may be returned to the user. The concepts and techniques described with reference to FIG. 2 are further described with respect to the following figures.

Figure 3:
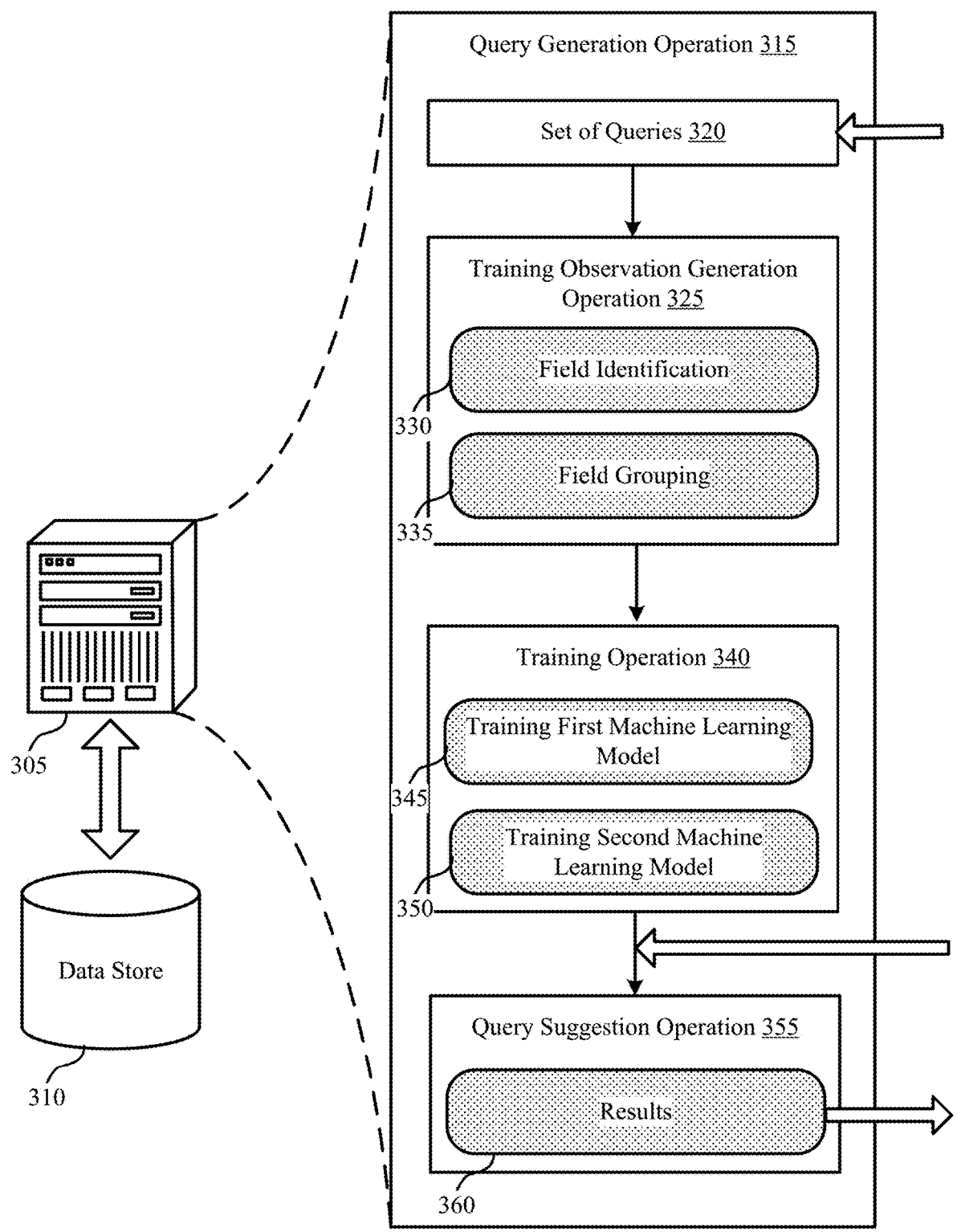
FIG. 3 illustrates an example of a computing system that supports generating a query using training observations in accordance with aspects of the present disclosure.

FIG. 3 illustrates an example of a computing system 300 that supports generating a query using training observations in accordance with aspects of the present disclosure. The computing system 300 may include a device 305 (e.g., an application server) and a data store 310. In some cases, the functions performed by the device 305 (such as application server) may instead be performed by a component of the data store 310. A user device (not shown) may support an application for data analytics using machine learning models or other models. Specifically, a user device in combination with the device 305 may support an application that provides generating a query using training observations and machine learning models. A user operating the user device may interact with the application to train a mathematical model (e.g., artificial intelligence model) at the device 305, where the device 305 may identify results 360 based on generating a suggested query. In some examples, the device 305 may provide the results 360 to a user device (not shown).

According to one or more aspects of the present disclosure, a user device may optionally display an interactive interface for receiving a request (from a user) to run a machine learning model (e.g., machine learning model). In some examples, the user device may display the interactive interface for receiving a request (from a user) to train or develop an artificial intelligence model. Alternatively, the device 305 may train or develop a mathematical model (e.g., artificial intelligence model, a machine learning model, etc.) without receiving a request from a user device. In some cases, the interface at the user device may run as a webpage within a web browser (e.g., as a software as a service (SaaS) product). In other cases, the interface may be part of an application downloaded onto the user device. A user operating the user device may input information into the user interface to specify aspects of the request to develop an artificial intelligence model. In some cases, a user may be associated with a user credential or user ID, and the user may log on to the user device using the user credential. In certain aspects, the device 305 (or application server) may not have the requested artificial intelligence model developed at the device 305. Additionally or alternatively, the device 305 may determine a need to develop an artificial intelligence model (e.g., machine learning model) for generating a suggested query. As described herein, the device 305 in conjunction with the data store 310 may perform a query generation operation 315.

According to one or more aspects of the present disclosure, the query generation operation 315 may be performed by the device 305, such as a server (e.g., an application server, a database server, a server cluster, a virtual machine, a container, etc.). Although not shown in FIG. 3, the query generation operation 315 may be performed by a user device, a data store 310, or some combination of these or similar devices. In some cases, the device 305 may be a component of a subsystem 125 as described with reference to FIG. 1. The device 305 may support computer aided data science, which may be performed by an artificial intelligence-enhanced data analytics framework. The device 305 may be an example of a general analysis machine and, as such, may perform data analytics and generation of suggested queries based on receiving an input query.

According to one or more aspects of the present disclosure, the device 305 may receive a set of queries 320 from one or more user devices (not shown). In some examples, the queries may be database queries, declarative queries or natural language queries. Upon receiving the set of queries 320, the device 305 may optionally convert the set of queries to a set of queries 320 executable at the device 305. Each query of the set of queries 320 may include a set of fields in a tenant-specific dataset associated with the query. In some instances, the device 305 may perform a training observation generation operation 325. As part of the training observation generation operation 325, the device 305 may perform a field identification operation 330. For example, the device 305 may identify that each query included in the set of queries 320 includes a set of fields. The device 305 may then perform a field grouping operation 335. In some cases, as part of the field grouping operation 335, the device 305 may generate a set of training observations for the query based on the set of fields. For example, the device 305 may generate a first training observation include a first subset of fields. Additionally or alternatively, the device 305 may generate a second training observation including a second subset of fields. In some cases, the first subset of fields may be greater than the second subset of fields.

Additionally or alternatively, the device 305 may identify a first permutation of the set of fields and a second permutation of the set of fields. The device 305 may then group fields included in the first permutation in the first training observation and fields included in the second permutation in the second training observation. As one example, upon receiving a query on "Opportunities" dataset grouped by "Region→Country→Year→Quarter," the following training observations may be generated:

Opportunities, <empty>, <empty>, <empty>->Region
Opportunities, Region, <empty>, <empty>->Country
Opportunities, Region, Country, <empty>->Year
Opportunities, Region, Country, Year->Quarter The training observation "Opportunities, <empty>, <empty>, <empty>->Region" may include a first permutation of the fields "Region," "Country," "Year," and "Quarter." Additionally, the training observation "Opportunities, Region, <empty>, <empty>->Country" may include a second permutation of the fields "Region," "Country," "Year," and "Quarter." The device 305 may store the generated set of training observations based on a subset of the set of fields (i.e., each training observation including a subset of the set of fields).

According to one or more aspects, the device 305 may perform a training operation 340. As part of the training operation 340, the device 305 may perform a training first machine learning model operation 345 and a training second machine learning model operation 350. In one example, the device 305 may train a first machine learning model on the stored set of training observations to determine grouping hierarchies including hierarchical relationships between the subset of the set of fields. In some examples, the device 305 may receive a query on the "Opportunities" dataset grouped by "Region," "Country," "Year," and "Quarter." The device 305 may determine that a hierarchical relationship exists between the fields of the query (Region→Country→Year→Quarter) in context of the dataset (e.g., Opportunities). The grouping hierarchies may be based on a sequence of the set of fields. The device 305 may train the first machine learning model to determine that a hierarchical relationship exists between "Country," "State," and "City" (e.g., Country→State→City).

As part of training second machine learning model operation 350, the device 305 may train a second machine learning model on the stored set of training observations to determine aggregation predictions including predicated functions associated with one or more of the subset of the set of fields. Additionally or alternatively, the device 305 may train the second machine learning model on the stored set of training observations to determine aggregation predictions including an aggregation field associated with one or more of the subset of the set of fields. In some examples, a predicted function may be based on the aggregation field. In some examples, the predicated functions associated with the one or more of the subset of the set of fields may include a mathematical operation on the one or more of the set of fields. As depicted herein, upon receiving a query such as "Average Duration" and "Sum of Amount" for "Opportunities" grouped by "Year→Month→Day," the following training observations may be generated:

Opportunities, Year, Month, Day, <empty>->Duration
Opportunities, Year, Month, Day, <empty>->Amount Additionally or alternatively, the aggregation predictions may be based on the hierarchical relationships between one or more of the subset of the set of fields. For instance, identifying the hierarchy between "Year," "Month," and "Day," the following permutations of training observations may be generated:

Opportunities, Year, Month, <empty>, <empty>->Duration
Opportunities, Year, Month, <empty>, <empty>->Amount
Opportunities, Year, <empty>, <empty>, <empty>->Duration
Opportunities, Year, <empty>, <empty>, <empty>->Amount
Opportunities, <empty>, <empty>, <empty>, <empty>->Duration
Opportunities, <empty>, <empty>, <empty>, <empty>->Amount In some examples, the device 305 may build a combined machine learning model based on the determined grouping hierarchies and the aggregation predictions. The device 305 may receive a query (from a user device) that is associated with the set of fields in the tenant-specific dataset associated with the query. Upon receiving the query, the device 305 may perform a query suggestion operation 355. As part of the query suggestion operation 355, the device 305 generates results 360. For example, upon receiving the input query, the device 305 may determine a set of suggested queries based on the received query and the combined machine learning model. The device 305 may rank the set of suggested queries based on the determined grouping hierarchies and the aggregation predictions. For instance, the device may determine that the grouping hierarchies are based on a sequence of the set of fields, and may further determine that the suggested query in response to a received query includes fields next in the sequence of the set of fields. For example, upon receiving a query on the "Opportunities" dataset grouped by "Region," "Country," "Year," and "Quarter," the device 305 may determine that a hierarchical relationship exists between the fields of the query (Region→Country→Year→Quarter) in context of the dataset (e.g., Opportunities). In such an example, the device 305 may suggest the "Opportunities" dataset grouped by "Region" as a first suggested query. That is, the device 305 may selects one of the set of suggested queries for display on the ranking of the set suggested queries. The device 305 may include the suggested query in the results 360. In some examples, the results 360 may be displayed via a user interface.

According to one or more aspects, if the device 305 determines that data for a tenant is insufficient for building the machine learning model (using training operation 340), the device 305 may leverage a semantic graph to apply explicit transfer learning via data lineage. Thus, without sufficient collective analytics usage, building relevant queries with relevant fields may be challenging. In some examples, the device 305 may leverage a semantic graph to apply explicit transfer learning via data lineage. The semantic graph may be configured to build relationships based on metadata in reports. For example, for every report which is associated to a single report type, the device 305 may find all matching datasets by field lineage to object fields by traversing a graph such that the device 305 may translate the report metadata into dataset based queries. For example, for a report "My Open Pipe" that uses the "Opty" report type, the report is grouped by the "Name" and "Stage" fields in the "Opportunities: object. These fields may also be extracted into "Opty_A," "Opty_B," and "Opty_Products" datasets. Thus, from a single report associated with a first dataset, multiple training observations in other datasets may be produced. In some examples, the following training observations may be generated:

Opty_A, <empty>, <empty>, <empty>->Name
Opty_A, Name, <empty>, <empty>->Stage
Opty_B, <empty>, <empty>, <empty>->OPPORTUNITY_NAME
Opty_B, OPPORTUNITY_NAME, <empty>, <empty>->OPPORTUNITY_STAGE
Opty_Products, <empty>, <empty>, <empty>->Opportunity.Name
Opty_Products, Opportunity.Name, <empty>, <empty>->Opportunity. Stage In some examples, the device 305 may determine that for the "Opportunities" dataset, the hierarchy of billing address is "Billing Country→Billing State→Billing City." The device 305 may not be able to generalize this to shipping address for "Opportunities" to infer the hierarchy "Shipping Country→Shipping State→Shipping City." Additionally, the device 305 may not be able to generalize this to other datasets with similar concepts such as users with home address. To build a generalized model of common concepts across datasets and to apply to datasets with sparse usage (e.g., small training sets), the device 305 may learn an ontology for analytics.

By building a novel corpus using sampled dataset of datasets, the device 305 may be able to train a word embedding using "Word2Vec" to encode the semantic similarities between fields based on their underlying values. For example, such word embedding may encode concepts such as "Billing Country," "Shipping Country," and "Home Country" to similar vectors using cosine similarity. With this, the device 305 may be able to build observations without the dataset and specific fields, instead using vectors representing concepts. These can be used in the same models but to predict vectors representing vectors in the same space which can then be searched through for dataset specific fields. For example, the device 305 may determine word embeddings for "Billing Country" to [1.01, 2.41], "Billing State: to [3.01, 4.41], and "Billing City" to [4.81, 2.31]. Since the billing address fields had similar values as home address fields, in this example, the embeddings for the home address fields may be similar but not the same. In another example, the device 305 may determine word embeddings for "Home Country" to [1.02, 2.40], "Home State" to [3.00, 4.40], and "Home City" to [4.82, 2.32]. With these observations, the device 305 may build the following observations that are all vectors instead of representing specific fields in specific datasets:

[1.01, 2.41], <empty>, <empty>->[3.01, 4.41]
[1.01, 2.41], [3.01, 4.41], <empty>->[4.81, 2.31]
[1.02, 2.40], <empty>, <empty>->[3.00, 4.40]
[1.02, 2.40], [3.00, 4.40], <empty>->[4.82, 2.32]

Thus, the device 305 may determine predictions in vectors instead of specific fields in specific datasets. These vectors can then be used to look up the dataset specific fields in the embeddings to produce the final next best field prediction.

Figure 4:
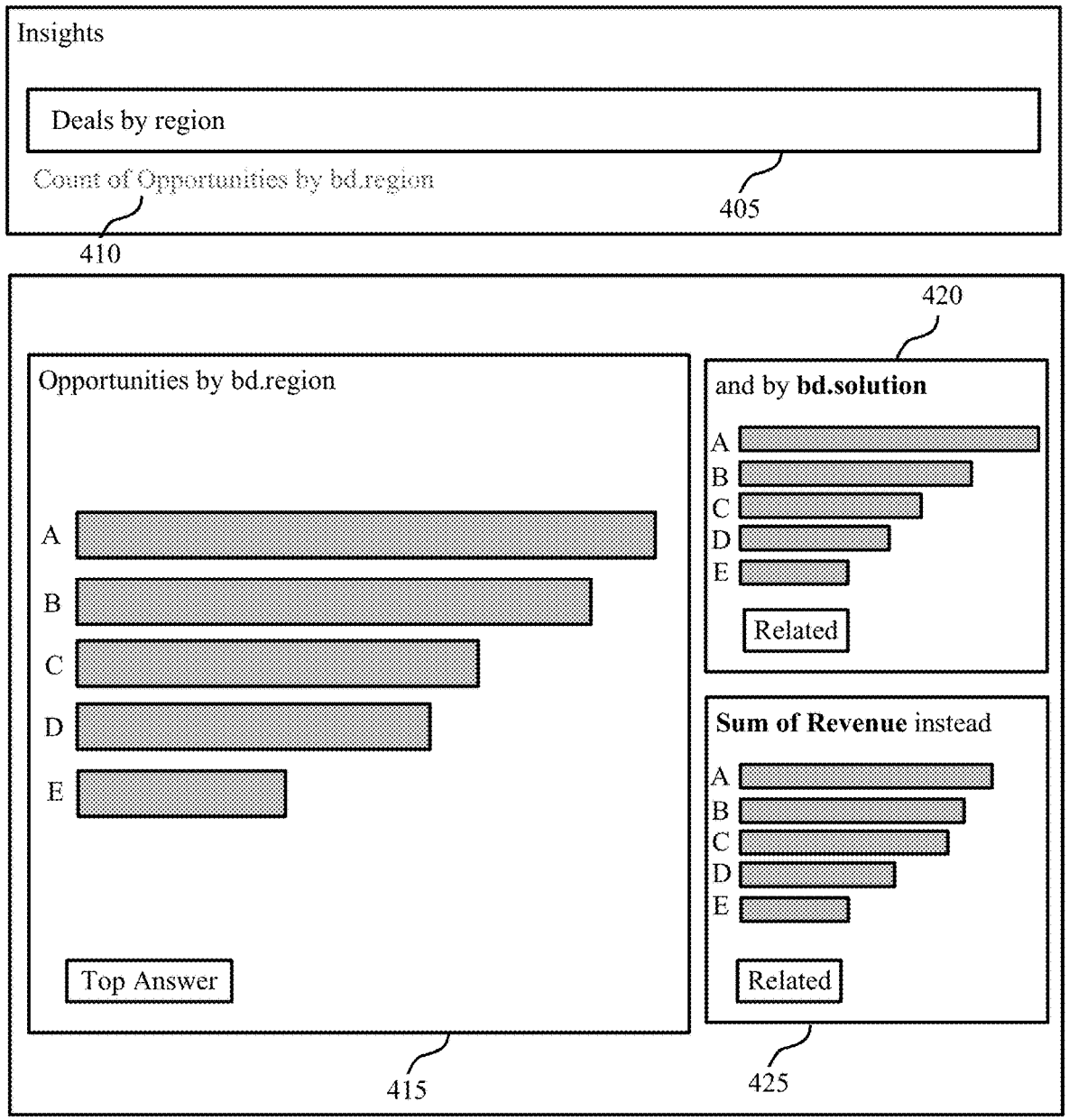
FIG. 4 illustrates an example of a user interface that supports generating a query using training observations in accordance with aspects of the present disclosure.

FIG. 4 illustrates an example of a user interface 400 that supports generating a query using training observations in accordance with aspects of the present disclosure. A user of a device may submit natural language queries via a device with the user interface 400. The user may be associated with a tenant of a multi-tenant database which has been using the cloud platform for data management. Therefore, there may be several data stores of data and metadata associated with the tenant which may be used to train a first machine learning model and a second machine learning model and build a combined machine learning model for the tenant. The combined machine learning model may be used to process a natural language query and generate related queries.

The user interface 400 may include a search box 405 where the user can submit a natural language query. Once the user submits the natural language query, the user interface 400 may send the natural language query to a database server with a machine learning model component. In some examples, the user interface 400 may send the natural language query to a database server with a machine learning model component a data lineage mapping component. For example, the natural language query may be processed by the database server (e.g., device 305 described with reference to FIG. 3) and the database server may identify a data query which may correspond to the natural language query. In the example of FIG. 4, the user may submit a natural language query "deals by region" in the search box 405. The database server may convert the natural language query "deals by region" to a data query "count of opportunities by bd.region" 410. The data query "count of opportunities by bd.region" 410 may be displayed on the user interface 400.

The user interface 400 may further include a result 415 of the data query "count of opportunities by bd.region" 410. As depicted in the example of FIG. 4, the user interface 400 may include a depiction of "Opportunities" grouped by "bd.region." The user interface 400 includes graphical representation of "Opportunities" in regions "A," "B," "C," "D," and "E." The result 415 may be a top answer to the natural language query "deals by region." According to one or more aspects, the database server may parse the data query "count of opportunities by bd.region" 410 to identify one or more fields. The database server may then determine a set of suggested queries based on the one or more fields and the combined machine learning model (e.g., a first machine learning model used to determine grouping hierarchies including hierarchical relationships between the subset of the one or more fields and a second machine learning model used to determine aggregation predictions including predicated functions associated with one or more of the subset of the one or more of fields). In some cases, the set of suggested queries may be ranked. For example, the user may receive a "related query" or highest ranked suggested data query. In the example of FIG. 4, the user may receive two related queries. The first related query may be suggested according to the next best grouping and the second related query may be suggested according to the next best aggregation field and function. For example, the first related query 420 may include "count of opportunities by bd.region and by bd.solution" and the second related query 425 may include "Sum of Revenue." Once the user receives related data queries, the user may have an option to download, share, or save the related data queries. The user action (i.e., if the user downloads, shares, or saves the related data queries) may be used to further train the machine learning model. In some examples, the user may provide a title or description for the received data query. In some cases, the title or description may be used to further train the machine learning model.

Figure 5:
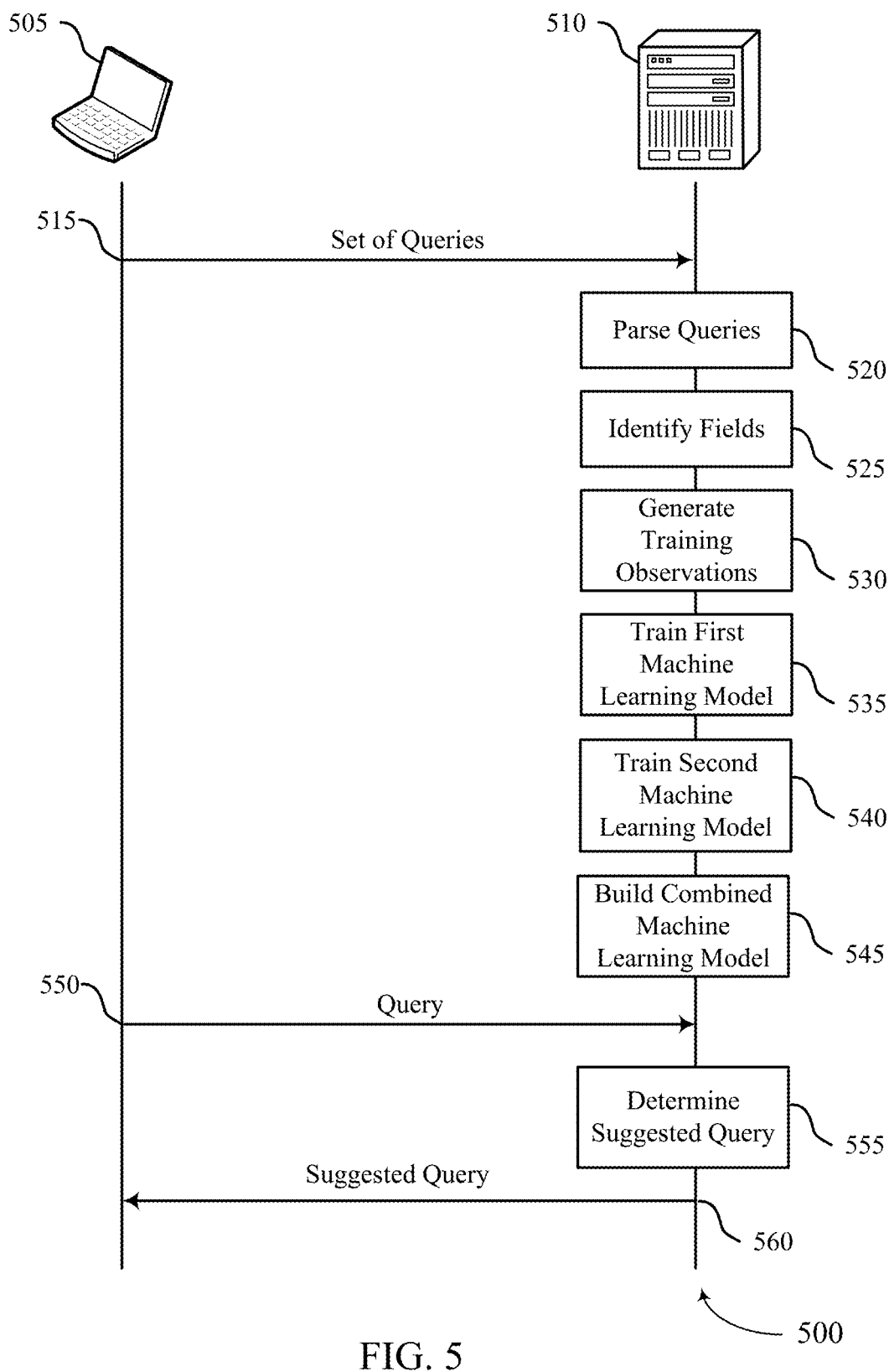
FIG. 5 illustrates an example of a process flow that supports generating a query using training observations in accordance with aspects of the present disclosure.

FIG. 5 illustrates an example of a process flow 500 that supports generating a query using training observations in accordance with aspects of the present disclosure. The process flow diagram 500 includes a user device 505 and a server 510. The user device 505 may be an example of the user device 205 as described with respect to FIG. 2, and the server 510 may be an example of the server 510 as described with respect to FIG. 2. Although one user device 505 is depicted in the example of FIG. 5, it may be understood that the process flow 500 may include multiple user devices 505. The server may represent a set of computing components, data storage components, and the like, that support a multi-tenant database system as described herein. The process illustrated in FIG. 5 may be performed for various tenants of the multiple tenant system.

In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added At 515, the server 510 may receive a set of queries (e.g., natural language queries, database queries, declarative queries, etc.), each query of the set of queries including a set of fields in a tenant-specific dataset associated with the query. In some examples, the set of queries may include a set of natural language queries. The server may receive the set of queries via a user interface.

At 520, the server 510 may parse each query of the set of queries (e.g., set of natural language queries) to identify the set of fields included in the set of queries. In some examples, the server 510 may convert (or otherwise determine) the set of natural language queries to a set of queries including a set of fields.

At 525, the server 510 may identify the set of fields included in the set of queries. At 530, the server 510 may generate a set of training observations for each query of the set of queries based on the set of fields included in each query. In some examples, the server 510 may generate a first training observation including a first subset of fields and a second training observation including a second subset of fields. In some cases, the first subset of fields may be greater than the second subset of fields. In some examples, server 510 may identify a first permutation of the set of fields and a second permutation of the set of fields. The server 510 may then group fields included in the first permutation in a first training observation and fields included in the second permutation in a second training observation.

At 535, the server 510 may train a first machine learning model on the stored set of training observations to determine grouping hierarchies including hierarchical relationships between the subset of the set of fields.

At 540, the server 510 may train a second machine learning model on the stored set of training observations to determine aggregation predictions including predicated functions associated with one or more of the subset of the set of fields. Additionally or alternatively, the server 510 may train the second machine learning model on the stored set of training observations to determine the aggregation predictions including an aggregation field associated with one or more of the subset of the set of fields. In some examples, a predicted function may be based on the aggregation field. In some cases, the predicated functions associated with the one or more of the subset of the set of fields may include a mathematical operation on the one or more of the subset of the set of fields.

At 545, the server 510 may build a combined machine learning model based on the determined grouping hierarchies and the aggregation predictions.

At 550, the user device 505 transmits a query (e.g., a natural language query) to the server 510. The query may be associated with the set of fields in the tenant-specific dataset associated with the query.

At 555, the server 510 may determine a set of suggested queries based on the received query and the combined machine learning model (determined at 550). The server 510 may rank the set of suggested queries based on the determined grouping hierarchies and the aggregation predictions. In some examples, the server 510 may select one of the set of suggested queries for display based on the ranking of the set suggested queries.

At 560, the server 510 may transmit the selected suggested query for display at the user device 505.

Figure 6:
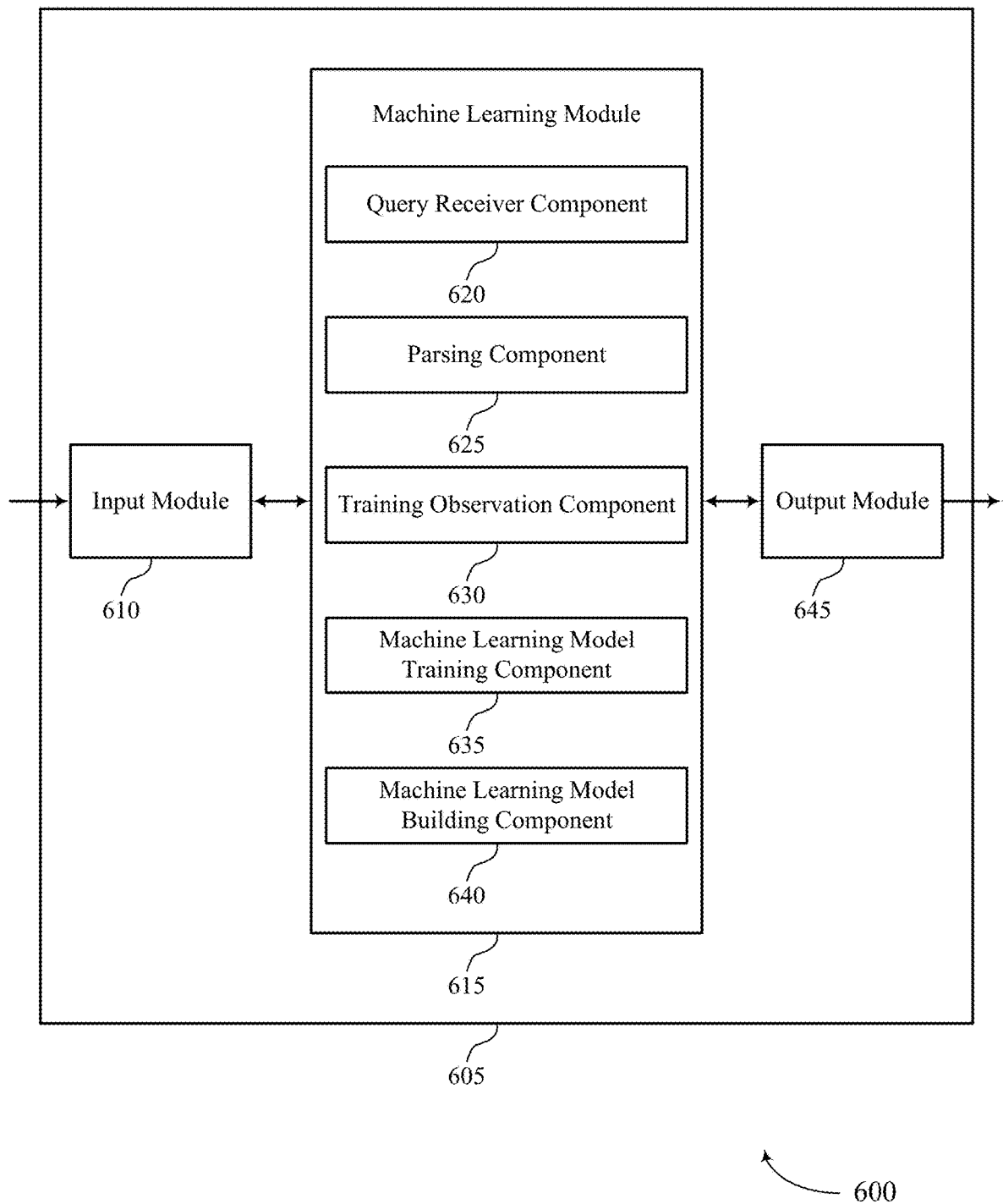
FIG. 6 shows a block diagram of an apparatus that supports generating a query using training observations in accordance with aspects of the present disclosure.

FIG. 6 shows a block diagram 600 of an apparatus 605 that supports generating a query using training observations in accordance with aspects of the present disclosure. The apparatus 605 may include an input module 610, a machine learning module 615, and an output module 645. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the machine learning module 615 to support generating a query using training observations. In some cases, the input module 610 may be a component of an input/output (I/O) controller 815 as described with reference to FIG. 8.

The machine learning module 615 may include a query receiver component 620, a parsing component 625, a training observation component 630, a machine learning model training component 635, and a machine learning model building component 640. The machine learning module 615 may be an example of aspects of the machine learning module 705 or 810 described with reference to FIGS. 7 and 8.

The machine learning module 615 and/or at least some of its various sub-components may be implemented in hardware, software executed by a processor, firmware, or any combination thereof. If implemented in software executed by a processor, the functions of the machine learning module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The machine learning module 615 and/or at least some of its various sub-components may be physically located at various positions, including being distributed such that portions of functions are implemented at different physical locations by one or more physical devices. In some examples, the machine learning module 615 and/or at least some of its various sub-components may be a separate and distinct component in accordance with various aspects of the present disclosure. In other examples, the machine learning module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The query receiver component 620 may receive a set of queries, each query of the set of queries including a set of fields in a tenant-specific dataset associated with the query. The parsing component 625 may parse each query of the set of queries to identify the set of fields included in the set of queries.

The training observation component 630 may store a set of training observations based on a subset of the set of fields. The machine learning model training component 635 may train a first machine learning model on the stored set of training observations to determine grouping hierarchies including hierarchical relationships between the subset of the set of fields and train a second machine learning model on the stored set of training observations to determine aggregation predictions including predicated functions associated with one or more of the subset of the set of fields. The machine learning model building component 640 may build a combined machine learning model based on the determined grouping hierarchies and the aggregation predictions.

The output module 645 may manage output signals for the apparatus 605. For example, the output module 645 may receive signals from other components of the apparatus 605, such as the machine learning module 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
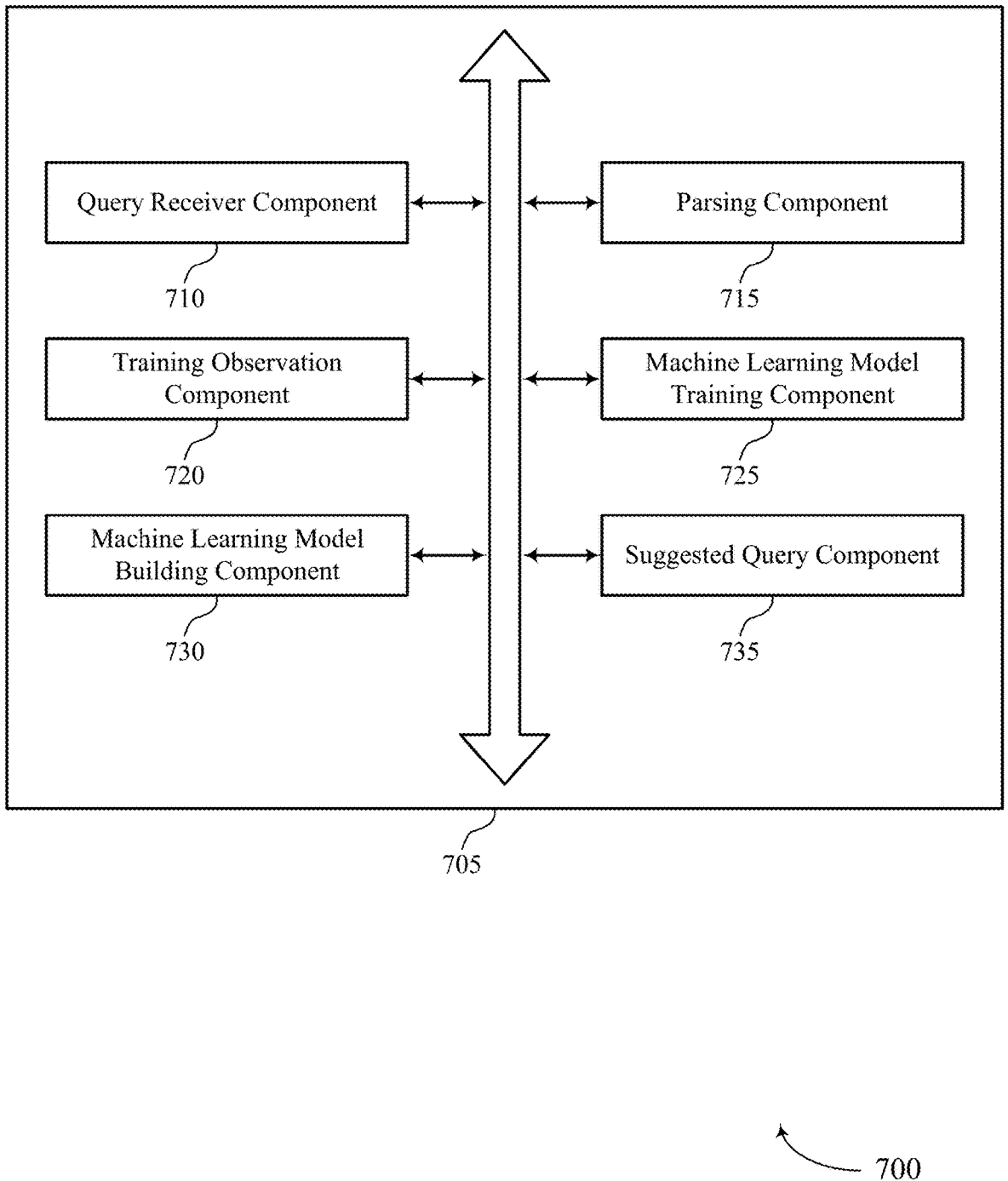
FIG. 7 shows a block diagram of a machine learning module that supports generating a query using training observations in accordance with aspects of the present disclosure.

FIG. 7 shows a block diagram 700 of a machine learning module 705 that supports generating a query using training observations in accordance with aspects of the present disclosure. The machine learning module 705 may be an example of aspects of a machine learning module 615 or a machine learning module 810 described herein. The machine learning module 705 may include a query receiver component 710, a parsing component 715, a training observation component 720, a machine learning model training component 725, a machine learning model building component 730, and a suggested query component 735. Each of these modules may communicate, directly or indirectly, with one another (e.g., via one or more buses).

The query receiver component 710 may receive a set of queries, each query of the set of queries including a set of fields in a tenant-specific dataset associated with the query. The parsing component 715 may parse each query of the set of queries to identify the set of fields included in the set of queries.

The training observation component 720 may store a set of training observations based on a subset of the set of fields. The machine learning model training component 725 may train a first machine learning model on the stored set of training observations to determine grouping hierarchies including hierarchical relationships between the subset of the set of fields. In some examples, the machine learning model training component 725 may train a second machine learning model on the stored set of training observations to determine aggregation predictions including predicated functions associated with one or more of the subset of the set of fields. The machine learning model building component 730 may build a combined machine learning model based on the determined grouping hierarchies and the aggregation predictions.

In some examples, the query receiver component 710 may receive a query that is associated with the set of fields in the tenant-specific dataset associated with the query. The suggested query component 735 may determine a set of suggested queries based on the received query and the combined machine learning model.

In some examples, the suggested query component 735 may rank the set of suggested queries based on the determined grouping hierarchies and the aggregation predictions. In some examples, the suggested query component 735 may select one of the set of suggested queries for display based on the ranking of the set suggested queries. In some examples, the suggested query component 735 may display the selected suggested query via the user interface.

In some examples, the query receiver component 710 may receive a query including a set of fields. In some examples, the training observation component 720 may generate a set of training observations for the query based on the set of fields.

In some examples, the training observation component 720 may generate a first training observation including a first subset of fields. In some examples, the training observation component 720 may generate a second training observation including a second subset of fields, the first subset of fields being greater than the second subset of fields.

In some examples, the training observation component 720 may identify a first permutation of the set of fields and a second permutation of the set of fields. In some examples, the training observation component 720 may group fields included in the first permutation in the first training observation and fields included in the second permutation in the second training observation. In some cases, the predicated functions associated with the one or more of the subset of the set of fields includes a mathematical operation on the one or more of the subset of the set of fields.

In some examples, the machine learning model training component 725 may train the second machine learning model on the stored set of training observations to determine aggregation predictions including an aggregation field associated with one or more of the subset of the set of fields, where a predicted function is based on the aggregation field.

In some cases, the aggregation predictions are based on the hierarchical relationships between one or more of the subset of the set of fields. In some cases, the grouping hierarchies are based on a sequence of the set of fields. In some cases, a suggested query in response to a received query includes fields next in the sequence of the set of fields. In some cases, the tenant-specific dataset is associated with at least one of reports, report types, data objects, data sets, or a combination thereof.

Figure 8:
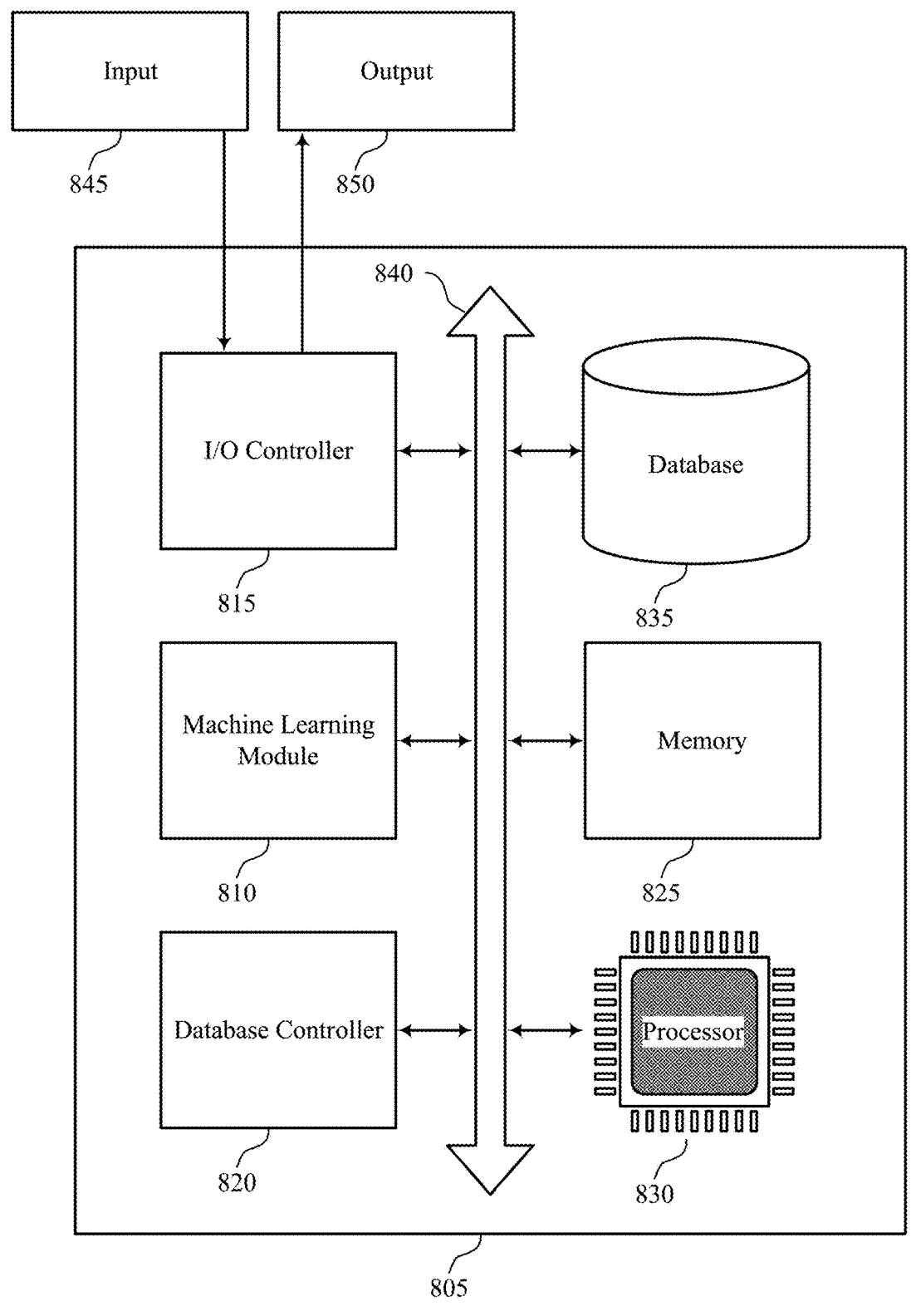
FIG. 8 shows a diagram of a system including a device that supports generating a query using training observations in accordance with aspects of the present disclosure.

FIG. 8 shows a diagram of a system 800 including a device 805 that supports generating a query using training observations in accordance with aspects of the present disclosure. The device 805 may be an example of or include the components of an application server or an apparatus 605 as described herein. The device 805 may include components for bi-directional data communications including components for transmitting and receiving communications, including a machine learning module 810, an I/O controller 815, a database controller 820, memory 825, a processor 830, and a database 835. These components may be in electronic communication via one or more buses (e.g., bus 840).

The machine learning module 810 may be an example of a machine learning module 615 or 705 as described herein. For example, the machine learning module 810 may perform any of the methods or processes described above with reference to FIGS. 6 and 7. In some cases, the machine learning module 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting generating a query using training observations).

Figure 9:
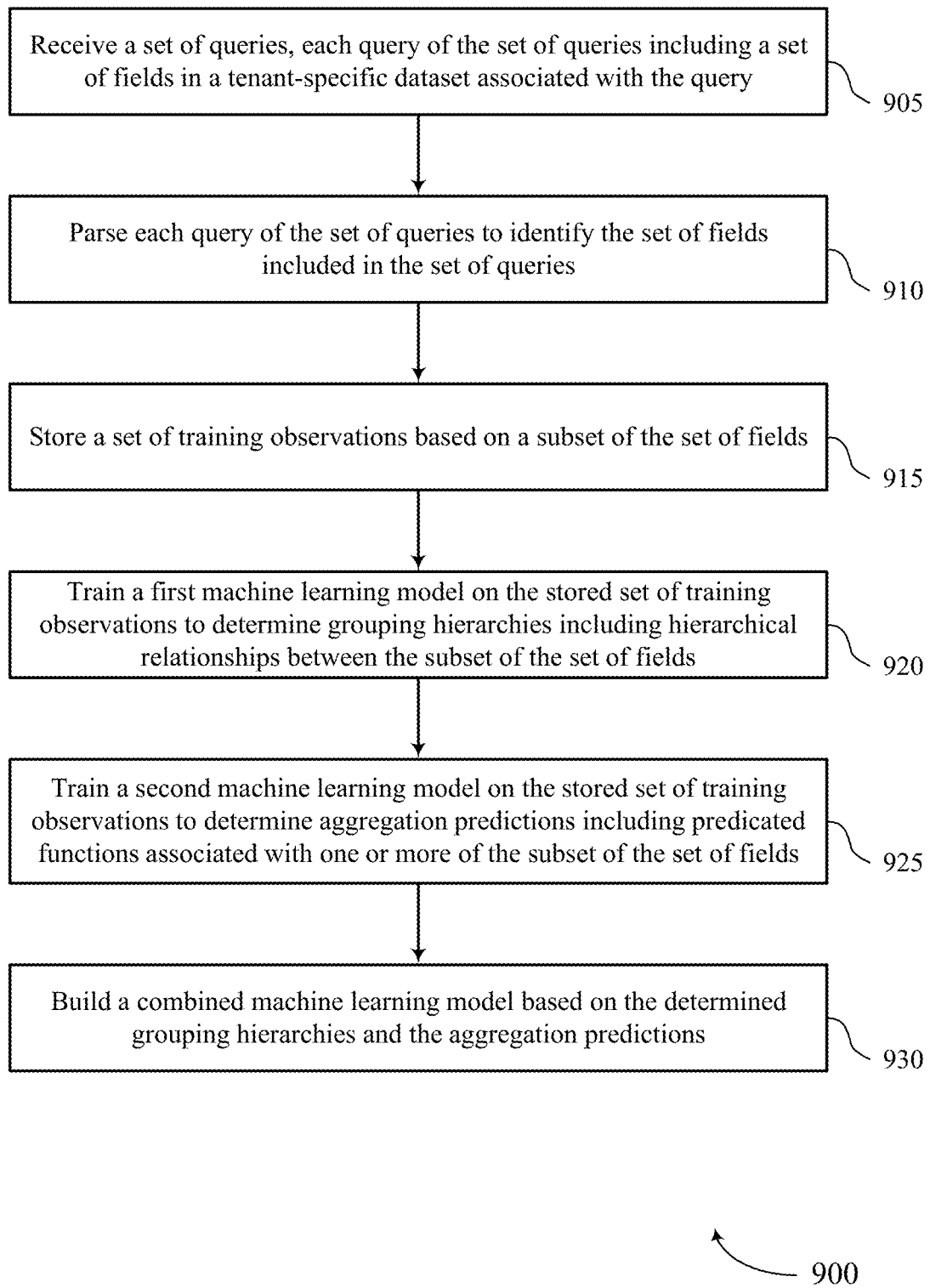
FIGS. 9 through 11 show flowcharts illustrating methods that support generating a query using training observations in accordance with aspects of the present disclosure.

FIG. 9 shows a flowchart illustrating a method 900 that supports generating a query using training observations in accordance with aspects of the present disclosure. The operations of method 900 may be implemented by an application server or its components as described herein. For example, the operations of method 900 may be performed by a machine learning module as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may receive a set of queries, each query of the set of queries including a set of fields in a tenant-specific dataset associated with the query. The operations of 905 may be performed according to the methods described herein. In some examples, aspects of the operations of 905 may be performed by a query receiver component as described with reference to FIGS. 6 through 8.

At 910, the application server may parse each query of the set of queries to identify the set of fields included in the set of queries. The operations of 910 may be performed according to the methods described herein. In some examples, aspects of the operations of 910 may be performed by a parsing component as described with reference to FIGS. 6 through 8.

At 915, the application server may store a set of training observations based on a subset of the set of fields. The operations of 915 may be performed according to the methods described herein. In some examples, aspects of the operations of 915 may be performed by a training observation component as described with reference to FIGS. 6 through 8.

At 920, the application server may train a first machine learning model on the stored set of training observations to determine grouping hierarchies including hierarchical relationships between the subset of the set of fields. The operations of 920 may be performed according to the methods described herein. In some examples, aspects of the operations of 920 may be performed by a machine learning model training component as described with reference to FIGS. 6 through 8.

At 925, the application server may train a second machine learning model on the stored set of training observations to determine aggregation predictions including predicated functions associated with one or more of the subset of the set of fields. The operations of 925 may be performed according to the methods described herein. In some examples, aspects of the operations of 925 may be performed by a machine learning model training component as described with reference to FIGS. 6 through 8.

At 930, the application server may build a combined machine learning model based on the determined grouping hierarchies and the aggregation predictions. The operations of 930 may be performed according to the methods described herein. In some examples, aspects of the operations of 930 may be performed by a machine learning model building component as described with reference to FIGS. 6 through 8.

Figure 10:
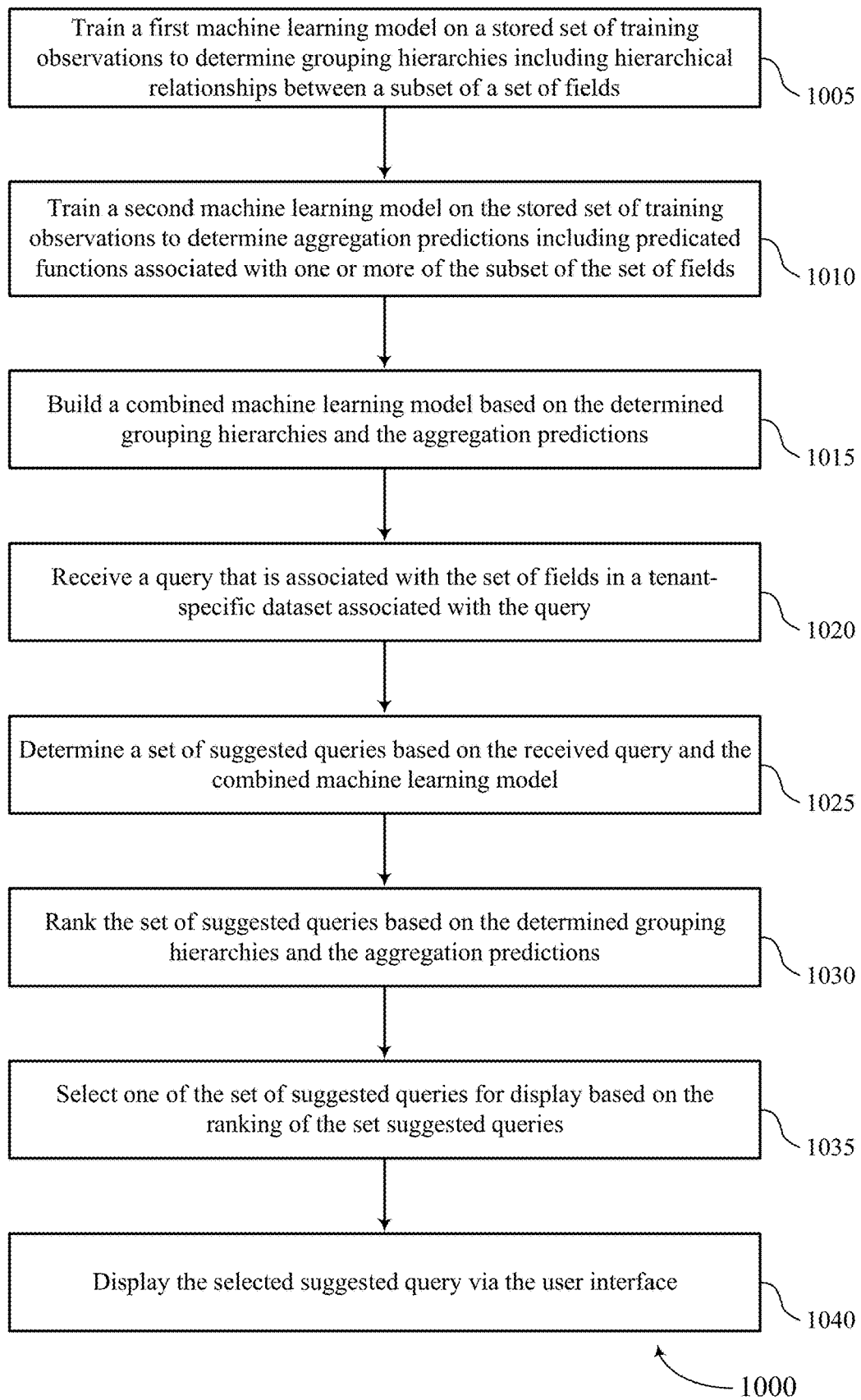

FIG. 10 shows a flowchart illustrating a method 1000 that supports generating a query using training observations in accordance with aspects of the present disclosure. The operations of method 1000 may be implemented by an application server or its components as described herein. For example, the operations of method 1000 may be performed by a machine learning module as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may train a first machine learning model on a stored set of training observations to determine grouping hierarchies including hierarchical relationships between the subset of the set of fields. The operations of 1005 may be performed according to the methods described herein. In some examples, aspects of the operations of 1005 may be performed by a machine learning model training component as described with reference to FIGS. 6 through 8.

At 1010, the application server may train a second machine learning model on the stored set of training observations to determine aggregation predictions including predicated functions associated with one or more of the subset of the set of fields. The operations of 1010 may be performed according to the methods described herein. In some examples, aspects of the operations of 1010 may be performed by a machine learning model training component as described with reference to FIGS. 6 through 8.

At 1015, the application server may build a combined machine learning model based on the determined grouping hierarchies and the aggregation predictions. The operations of 1015 may be performed according to the methods described herein. In some examples, aspects of the operations of 1015 may be performed by a machine learning model building component as described with reference to FIGS. 6 through 8.

At 1020, the application server may receive a query that is associated with the set of fields in a tenant-specific dataset associated with the query. The operations of 1020 may be performed according to the methods described herein. In some examples, aspects of the operations of 1020 may be performed by a query receiver component as described with reference to FIGS. 6 through 8.

At 1025, the application server may determine a set of suggested queries based on the received query and the combined machine learning model. The operations of 1025 may be performed according to the methods described herein. In some examples, aspects of the operations of 1025 may be performed by a suggested query component as described with reference to FIGS. 6 through 8.

At 1030, the application server may rank the set of suggested queries based on the determined grouping hierarchies and the aggregation predictions. The operations of 1030 may be performed according to the methods described herein. In some examples, aspects of the operations of 1030 may be performed by a suggested query component as described with reference to FIGS. 6 through 8.

At 1035, the application server may select one of the set of suggested queries for display based on the ranking of the set suggested queries. The operations of 1035 may be performed according to the methods described herein. In some examples, aspects of the operations of 1035 may be performed by a suggested query component as described with reference to FIGS. 6 through 8.

At 1040, the application server may display the selected suggested query via the user interface. The operations of 1040 may be performed according to the methods described herein. In some examples, aspects of the operations of 1040 may be performed by a suggested query component as described with reference to FIGS. 6 through 8.

Figure 11:
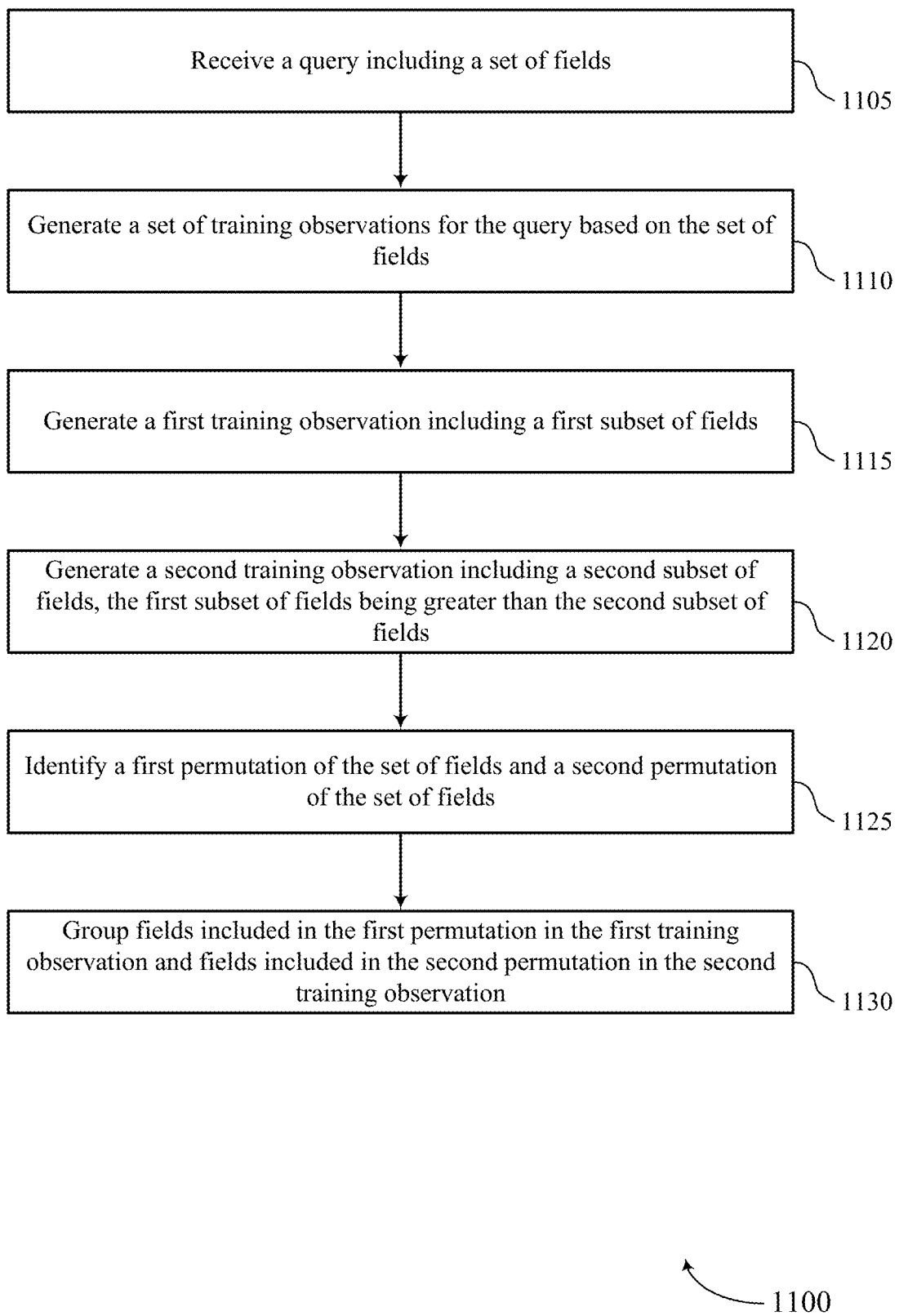

FIG. 11 shows a flowchart illustrating a method 1100 that supports generating a query using training observations in accordance with aspects of the present disclosure. The operations of method 1100 may be implemented by an application server or its components as described herein. For example, the operations of method 1100 may be performed by a machine learning module as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may receive a query including a set of fields. The operations of 1105 may be performed according to the methods described herein. In some examples, aspects of the operations of 1105 may be performed by a query receiver component as described with reference to FIGS. 6 through 8.

At 1110, the application server may generate a set of training observations for the query based on the set of fields. The operations of 1110 may be performed according to the methods described herein. In some examples, aspects of the operations of 1110 may be performed by a training observation component as described with reference to FIGS. 6 through 8.

At 1115, the application server may generate a first training observation including a first subset of fields. The operations of 1115 may be performed according to the methods described herein. In some examples, aspects of the operations of 1115 may be performed by a training observation component as described with reference to FIGS. 6 through 8.

At 1120, the application server may generate a second training observation including a second subset of fields, the first subset of fields being greater than the second subset of fields. The operations of 1120 may be performed according to the methods described herein. In some examples, aspects of the operations of 1120 may be performed by a training observation component as described with reference to FIGS. 6 through 8.

At 1125, the application server may identify a first permutation of the set of fields and a second permutation of the set of fields. The operations of 1125 may be performed according to the methods described herein. In some examples, aspects of the operations of 1125 may be performed by a training observation component as described with reference to FIGS. 6 through 8.

At 1130, the application server may group fields included in the first permutation in the first training observation and fields included in the second permutation in the second training observation. The operations of 1130 may be performed according to the methods described herein. In some examples, aspects of the operations of 1130 may be performed by a training observation component as described with reference to FIGS. 6 through 8.

A method of building a machine learning model is described. The method may include receiving a set of queries, each query of the set of queries including a set of fields in a tenant-specific dataset associated with the query, parsing each query of the set of queries to identify the set of fields included in the set of queries, storing a set of training observations based on a subset of the set of fields, training a first machine learning model on the stored set of training observations to determine grouping hierarchies including hierarchical relationships between the subset of the set of fields, training a second machine learning model on the stored set of training observations to determine aggregation predictions including predicated functions associated with one or more of the subset of the set of fields, and building a combined machine learning model based on the determined grouping hierarchies and the aggregation predictions.

An apparatus for building a machine learning model is described. The apparatus may include a processor, memory coupled with the processor, and instructions stored in the memory. The instructions may be executable by the processor to cause the apparatus to receive a set of queries, each query of the set of queries including a set of fields in a tenant-specific dataset associated with the query, parse each query of the set of queries to identify the set of fields included in the set of queries, store a set of training observations based on a subset of the set of fields, train a first machine learning model on the stored set of training observations to determine grouping hierarchies including hierarchical relationships between the subset of the set of fields, train a second machine learning model on the stored set of training observations to determine aggregation predictions including predicated functions associated with one or more of the subset of the set of fields, and build a combined machine learning model based on the determined grouping hierarchies and the aggregation predictions.

Another apparatus for building a machine learning model is described. The apparatus may include means for receiving a set of queries, each query of the set of queries including a set of fields in a tenant-specific dataset associated with the query, parsing each query of the set of queries to identify the set of fields included in the set of queries, storing a set of training observations based on a subset of the set of fields, training a first machine learning model on the stored set of training observations to determine grouping hierarchies including hierarchical relationships between the subset of the set of fields, training a second machine learning model on the stored set of training observations to determine aggregation predictions including predicated functions associated with one or more of the subset of the set of fields, and building a combined machine learning model based on the determined grouping hierarchies and the aggregation predictions.

A non-transitory computer-readable medium storing code for building a machine learning model is described. The code may include instructions executable by a processor to receive a set of queries, each query of the set of queries including a set of fields in a tenant-specific dataset associated with the query, parse each query of the set of queries to identify the set of fields included in the set of queries, store a set of training observations based on a subset of the set of fields, train a first machine learning model on the stored set of training observations to determine grouping hierarchies including hierarchical relationships between the subset of the set of fields, train a second machine learning model on the stored set of training observations to determine aggregation predictions including predicated functions associated with one or more of the subset of the set of fields, and build a combined machine learning model based on the determined grouping hierarchies and the aggregation predictions.

Some examples of the method, apparatuses, and non-transitory computer-readable medium described herein may further include operations, features, means, or instructions for receiving a query that may be associated with the set of fields in the tenant-specific dataset associated with the query, and determining a set of suggested queries based on the received query and the combined machine learning model.

Some examples of the method, apparatuses, and non-transitory computer-readable medium described herein may further include operations, features, means, or instructions for ranking the set of suggested queries based on the determined grouping hierarchies and the aggregation predictions, selecting one of the set of suggested queries for display based on the ranking of the set suggested queries, and displaying the selected suggested query via the user interface.

Some examples of the method, apparatuses, and non-transitory computer-readable medium described herein may further include operations, features, means, or instructions for receiving a query including a set of fields, and generating a set of training observations for the query based on the set of fields.

In some examples of the method, apparatuses, and non-transitory computer-readable medium described herein, generating the set of training observations may include operations, features, means, or instructions for generating a first training observation including a first subset of fields, and generating a second training observation including a second subset of fields, the first subset of fields being greater than the second subset of fields.

Some examples of the method, apparatuses, and non-transitory computer-readable medium described herein may further include operations, features, means, or instructions for identifying a first permutation of the set of fields and a second permutation of the set of fields, and grouping fields included in the first permutation in the first training observation and fields included in the second permutation in the second training observation.

In some examples of the method, apparatuses, and non-transitory computer-readable medium described herein, training the second machine learning model further may include operations, features, means, or instructions for training the second machine learning model on the stored set of training observations to determine aggregation predictions including an aggregation field associated with one or more of the subset of the set of fields, where a predicted function may be based on the aggregation field.

In some examples of the method, apparatuses, and non-transitory computer-readable medium described herein, the aggregation predictions may be based on the hierarchical relationships between one or more of the subset of the set of fields. In some examples of the method, apparatuses, and non-transitory computer-readable medium described herein, the grouping hierarchies may be based on a sequence of the set of fields.

In some examples of the method, apparatuses, and non-transitory computer-readable medium described herein, a suggested query in response to a received query includes fields next in the sequence of the set of fields.

In some examples of the method, apparatuses, and non-transitory computer-readable medium described herein, the predicated functions associated with the one or more of the subset of the set of fields includes a mathematical operation on the one or more of the subset of the set of fields. In some examples of the method, apparatuses, and non-transitory computer-readable medium described herein, the tenant-specific dataset may be associated with at least one of reports, report types, data objects, data sets, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method for building a machine learning model, comprising:
receiving a first plurality of queries, each query of the first plurality of queries comprising a plurality of fields in a tenant-specific dataset associated with the query;
parsing each query of the first plurality of queries to identify the plurality of fields included in the first plurality of queries;
identifying a first permutation and a second permutation of the plurality of fields;
grouping fields included in the first permutation in a first training data and fields included in the second permutation in a second training data;
storing a plurality of training data comprising the first training data and the second training data based on a subset of fields of the plurality of fields;
training a first machine learning model on the stored plurality of training data to determine grouping hierarchies comprising hierarchical relationships between the subset of fields of the plurality of fields based on a sequential order in which the subset of fields are grouped, wherein the sequential order filters fields based on a context, the sequential order being based on one or more data relationships among the fields of the subset of fields, the data relationship indicating that a first field is to follow a second field in accordance with the stored training data associated with the first field and the stored training data associated with the second field;
training a second machine learning model on the stored plurality of training data to determine aggregation predictions comprising predicated functions associated with one or more of the subset of fields of the plurality of fields; and
building a combined machine learning model based on the determined grouping hierarchies and the aggregation predictions.

2. The method of claim 1, further comprising:
receiving a query that is associated with the plurality of fields in the tenant-specific dataset associated with the query; and
determining a second plurality of queries based on the received query and the combined machine learning model.

3. The method of claim 2, further comprising:
ranking the second plurality of queries based on the determined grouping hierarchies and the aggregation predictions;
selecting one of the second plurality of queries for display based on the ranking of the second plurality of queries; and
displaying the selected query via a user interface.

4. The method of claim 1, further comprising:
receiving a query comprising a set of fields; and
generating a set of training data for the query based on the set of fields.

5. The method of claim 4, wherein generating the set of training data comprises:
generating a first training data comprising a first subset of fields; and
generating a second training data comprising a second subset of fields, the first subset of fields being greater than the second subset of fields.

6. The method of claim 1, wherein training the second machine learning model further comprises:
training the second machine learning model on the stored plurality of training data to determine the aggregation predictions comprising an aggregation field associated with one or more of the subset of fields of the plurality of fields, wherein a predicted function is based on the aggregation field.

7. The method of claim 6, wherein the aggregation predictions are based on the hierarchical relationships between one or more of the subset of fields of the plurality of fields.

8. The method of claim 1, wherein the grouping hierarchies are based on a sequence of the plurality of fields.

9. The method of claim 8, wherein a second query in response to a received query comprises fields next in the sequence of the plurality of fields.

10. The method of claim 1, wherein the predicated functions associated with the one or more of the subset of fields of the plurality of fields comprises a mathematical operation on the one or more of the subset of fields of the plurality of fields.

11. The method of claim 1, wherein the tenant-specific dataset is associated with at least one of reports, report types, data objects, data sets, or a combination.

12. An apparatus for building a machine learning model, comprising:
a processor, memory coupled with the processor; and
instructions stored in the memory and executable by the processor to cause the apparatus to:
receive, via a user interface, a first plurality of queries, each query of the first plurality of queries comprising a plurality of fields in a tenant-specific dataset associated with the query;
parse each query of the first plurality of queries to identify the plurality of fields included in the first plurality of queries;
identify a first permutation and a second permutation of the plurality of fields;
group fields included in the first permutation in a first training data and fields included in the second permutation in a second training data;
store a plurality of training data comprising the first training data and the second training data based on a subset of fields of the plurality of fields;
train a first machine learning model on the stored plurality of training data to determine grouping hierarchies comprising hierarchical relationships between the subset of fields of the plurality of fields based on a sequential order in which the subset of fields are grouped, wherein the sequential order filters fields based on a context, the sequential order being based on one or more data relationships among the fields of the subset of fields, the data relationship indicating that a first field is to follow a second field in accordance with the stored training data associated with the first field and the stored training data associated with the second field;
train a second machine learning model on the stored plurality of training data to determine aggregation predictions comprising predicated functions associated with one or more of the subset of fields of the plurality of fields; and
build a combined machine learning model based on the determined grouping hierarchies and the aggregation predictions.

13. The apparatus of claim 12, wherein the instructions are further executable by the processor to cause the apparatus to:
- receive a query that is associated with the plurality of fields in the tenant-specific dataset associated with the query; and
- determine a second plurality of queries based on the received query and the combined machine learning model.

14. The apparatus of claim 13, wherein the instructions are further executable by the processor to cause the apparatus to:
- rank the second plurality of queries based on the determined grouping hierarchies and the aggregation predictions;
- select one of the second plurality of queries for display based on the ranking of the second plurality of queries; and
- display the selected query via the user interface.

15. The apparatus of claim 12, wherein the instructions are further executable by the processor to cause the apparatus to:
- receive a query comprising a set of fields; and
- generate a set of training data for the query based on the set of fields.

16. The apparatus of claim 15, wherein the instructions to generate the set of training data are executable by the processor to cause the apparatus to:
- generate a first training data comprising a first subset of fields; and
- generate a second training data comprising a second subset of fields, the first subset of fields being greater than the second subset of fields.

17. A non-transitory computer-readable medium storing code for building a machine learning model, the code comprising instructions executable by a processor to:
- receive, via a user interface, a first plurality of queries, each query of the first plurality of queries comprising a plurality of fields in a tenant-specific dataset associated with the query;
- parse each query of the first plurality of queries to identify the plurality of fields included in the first plurality of queries;
- identify a first permutation and a second permutation of the plurality of fields;
- group fields included in the first permutation in a first training data and fields included in the second permutation in a second training data;
- store a plurality of training data comprising the first training data and the second training data based on a subset of fields the plurality of fields;
- train a first machine learning model on the stored plurality of training data to determine grouping hierarchies comprising hierarchical relationships between the subset of fields of the plurality of fields based on a sequential order in which the subset of fields are grouped, wherein the sequential order filters fields based on a context, the sequential order being based on one or more data relationships among the fields of the subset of fields, the data relationship indicating that a first field is to follow a second field in accordance with the stored training data associated with the first field and the stored training data associated with the second field;
- train a second machine learning model on the stored plurality of training data to determine aggregation predictions comprising predicated functions associated with one or more of the subset of fields of the plurality of fields; and
- build a combined machine learning model based on the determined grouping hierarchies and the aggregation predictions.

18. The non-transitory computer-readable medium of claim 17, wherein the instructions are further executable to:
- receive a query that is associated with the plurality of fields in the tenant-specific dataset associated with the query; and
- determine a second plurality of queries based on the received query and the combined machine learning model.

* * * * *